Sept. 20, 1971 C. W. HELWIG 3,605,710
APPARATUS AND METHOD FOR IMPROVING GASOLINE COMBUSTION
IN INTERNAL COMBUSTION ENGINES
Filed June 1, 1970 2 Sheets-Sheet 1

INVENTOR
CARL W. HELWIG
BY
ROBERT C. COMSTOCK
ATTORNEY

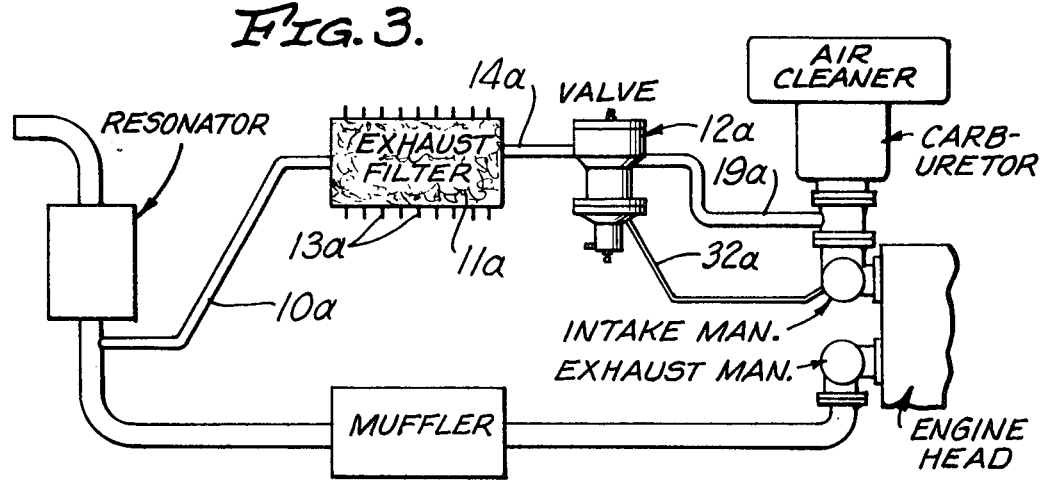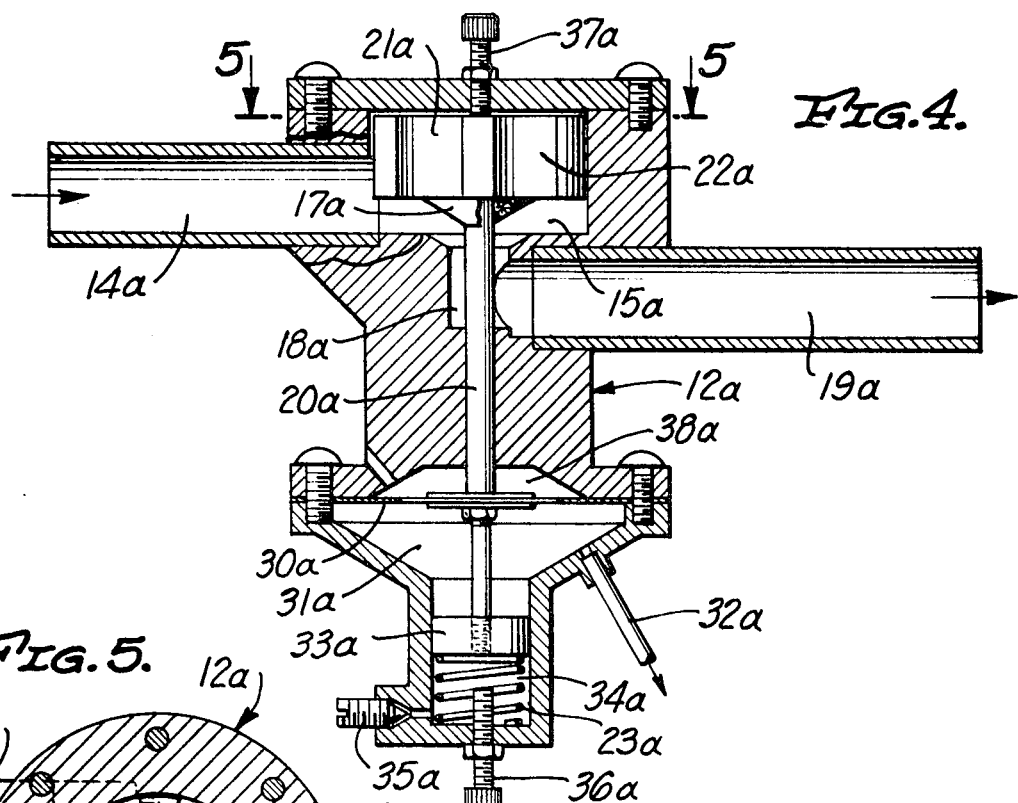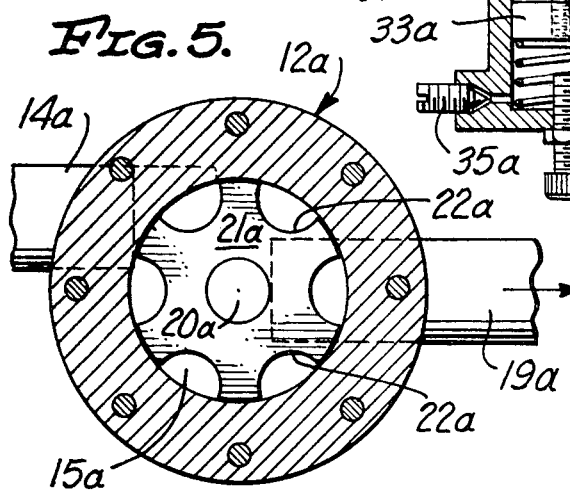

United States Patent Office 3,605,710
Patented Sept. 20, 1971

3,605,710
APPARATUS AND METHOD FOR IMPROVING GASOLINE COMBUSTION IN INTERNAL COMBUSTION ENGINES
Carl W. Helwig, 906 Crestview Ave., Glendale, Calif. 91202
Filed June 1, 1970, Ser. No. 42,379
Int. Cl. F02m 25/06
U.S. Cl. 123—119A            4 Claims

ABSTRACT OF THE DISCLOSURE

An apparatus and method for improving gasoline combustion in internal combustion engines. Lead is now added to gasoline to retard its combustion. The present invention eliminates lead and utilizes a deliberate feedback of exhaust fumes to the intake manifold to improve the combustion through slower burning of the gasoline. Exhaust fumes pass through an exhaust filter and cooler to a control valve assembly. Depression of the accelerator automatically controls the flow of exhaust fumes from the control valve assembly to the intake manifold, where such fumes are mixed with the gasoline.

BACKGROUND OF THE INVENTION

Field of the invention

The invention relates to an apparatus and method for improving gasoline combustion in internal combustion engines such as those now used in automobiles and other vehicles.

Description of the prior art

Recirculation of exhaust fumes from an internal combustion engine has been used in the past with the addition of special added ingredients for the purpose of utilizing remaining combustion elements which were left unconsumed. The present invention involves recirculation of a portion of the exhaust fumes for an entirely different purpose, namely to retard the combustion and to perform the same function which is now performed by undesirable lead additives.

SUMMARY OF THE INVENTION

The invention comprises an apparatus and method for improving gasoline combustion and thus provide better mileage in internal combustion engines of the type used in automobiles and other vehicles. Such vehicles now use gasoline to which lead has been added for the purpose of retarding the combustion of the gasoline. The present invention provides an apparatus and method which utilizes exhaust fumes to achieve the same effect and result, making it possible to eliminate costly and undesirable lead additives.

It is accordingly the primary object of the present invention to provide a new and improved apparatus and method of the type set forth above and particularly one which achieves the desirable result of eliminating lead from gasoline.

It is a related object of the invention to provide a method and apparatus of the type described which increases gas mileage by achieving more thorough combustion of the gasoline due to slower burning caused by the deliberate admixture of exhaust fumes with the gasoline supply to the engine.

Another object of the invention is to provide means for controlling the flow of exhaust fumes to the intake manifold. In particular, exhaust feedback control means are provided which are controlled by depressing the accelerator of the engine.

It is also among the objects of the invention to provide such valve means which are capable of continued satisfactory operation even when subjected to the deleterious heat and corrosive chemicals present in exhaust fumes.

A further object of the invention is to provide means for cooling the exhaust fumes and removing sparks before the exhaust fumes are returned to the intake manifold.

It is also among the objects of the invention to provide means for adjusting the rate of flow of the exhaust fumes.

It is accordingly among the objects of the present invention to provide an apparatus and method of the type described having all of the advantages and benefits set forth above and which follow from the apparatus and method described hereinafter in this application.

My invention also comprises such other objects, advantages and capabilities as will later more fully appear and which are inherently possessed by my invention.

While I have shown in the accompanying drawings a preferred embodiment of my invention, it should be understood that the same is susceptible of modification and change without departing from the spirit of my invention.

BRIEF DESCRIPTION OF THE DRAWING

FIG. 3 is a diagrammatic view similar to FIG. 1 showing a second embodiment of the invention;

FIG. 4 is a sectional view of the second embodiment of the invention in which a valve is controlled by the vacuum of the intake manifold;

FIG. 5 is a transverse sectional view taken on line 5—5 of FIG. 4.

DESCRIPTION OF THE PREFERRED EMBODIMENT

Figure 1:
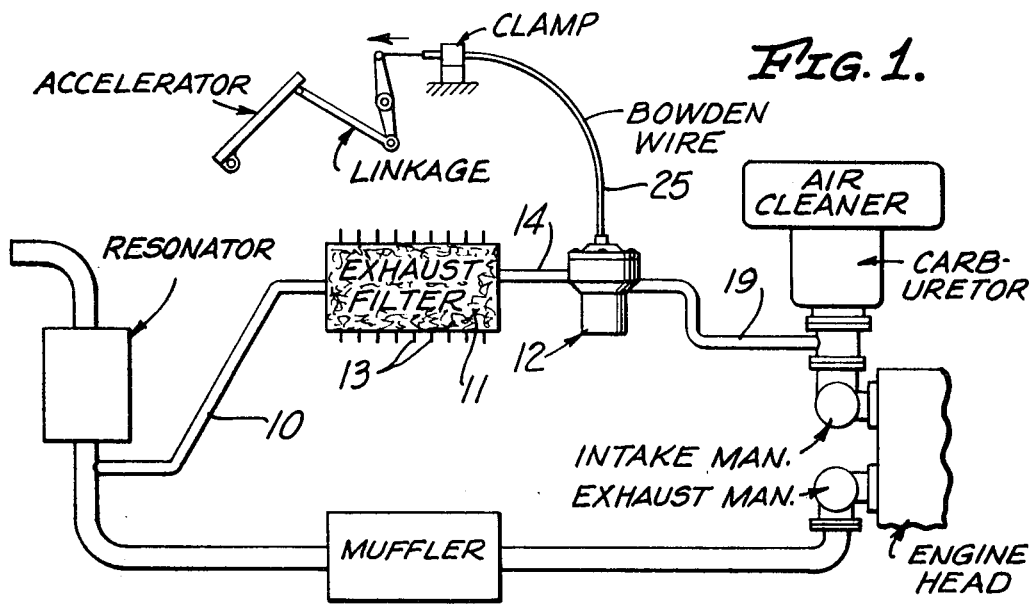
FIG. 1 is a diagrammatic view showing the relationship between a first embodiment of the invention and the relevant parts of an internal combustion engine.

A first embodiment which has been selected to illustrate my invention is designed to be used with a conventional internal combustion engine such as those which are now in use in automobiles and other vehicles. The conventional structure of the engine and its parts are well known to those skilled in the art and will not be described except by reference.

The apparatus and method of my invention contemplate connecting a take-off line 10 to the exhaust system of the engine, preferably beyond the muffler. The line 10 is connected to an exhaust modifier 11 which preferably comprises an aluminum chamber which is packed with a suitable packing material, such as aluminum shavings, steel wool or the like. The exhaust fumes flow through the exhaust modifier 11 from one end thereof to the other and are cooled as they pass through the packing material.

The outside of the exhaust modifier 11 is preferably provided with a plurality of outwardly directed or radial aluminum cooling fins 13, which act to radiate and dissipate heat which is transferred from the exhaust fumes. The exhaust modifier 11 also acts as a spark arrester, to prevent any sparks from flowing through the system and causing premature ignition in the engine.

An inlet line 14 extends from the exhaust modifier 11 to the inlet chamber 15 of a control valve assembly 12. The inlet chamber 15 is provided with an outlet port 16 which is normally closed by a conical control valve 17, which is preferably formed of or lined with non-metallic frictional material, such as brake lining material. Such material is capable of withstanding the combined heat, corrosive gases and abrasion to which the valve 17 is subjected in use. The port 16 connnects to an outlet chamber 18, which is in turn connected to an inlet line 19, which leads to the intake manifold of the engine.

The control valve 17 is mounted for rotational movement on an elongated shaft 20. The control valve 17 is connected to a spinner 21, which has a plurality of vertically directed recesses 22. When the gas flow enters the inlet chamber 15 from the inlet line 14, it strikes the recesses 22 of the spinner 21 and causes the spinner 21 to rotate on the shaft 20. The conical control valve 17 causes it to seat more firmly against the outlet port 16 and also acts to provide even distribution of wire on these meeting elements.

Figure 2:
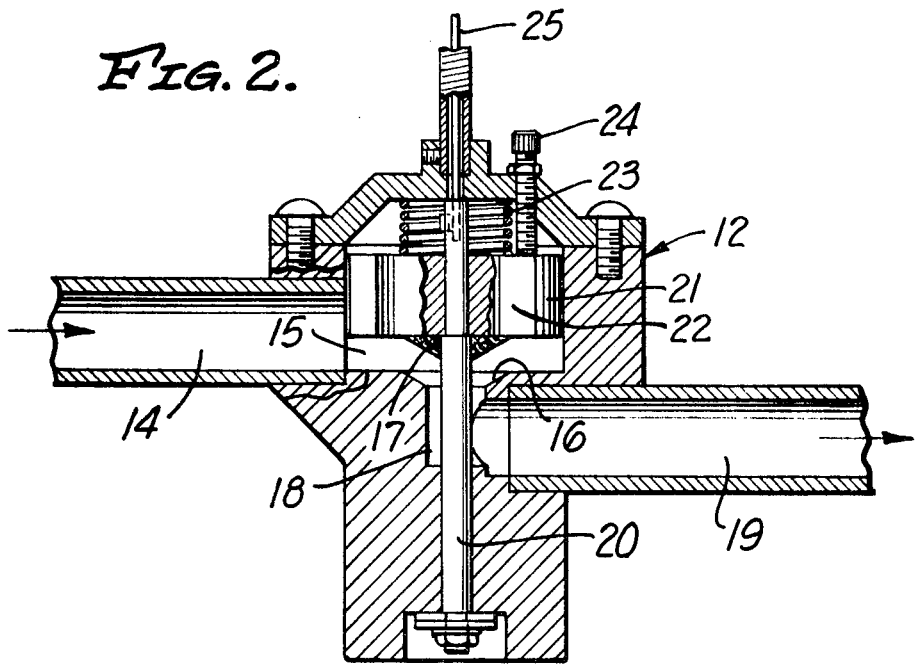
FIG. 2 is a sectional view of such first embodiment of the invention in which a valve is controlled by a cable connected to the accelerator pedal.

A coil spring 23 exerts downward pressure against the spinner 21, normally urging the control valve 17 into closed position, which is shown as a downward position in FIG. 2 of the drawings.

An elongated wire of the type commonly referred to as a Bowden wire is connected at one end to the shaft 20 and at its other end to the accelerator pedal of the internal combustion engine. This connection is made directly or through linkage of the type shown in FIG. 1 of the drawings.

In this embodiment of the invention, the coil spring 23 acts to prevent an undesirable "dieseling" effect. This is an effect through which an internal combustion engine will continue to operate even though the ignition is shut off. The spring 23 acts to close the valve 17 in order to prevent such dieseling from occurring. An adjusting screw 24 may be provided to limit the upward or opening movement of the spinner 21.

A second embodiment of the invention is shown in FIGS. 3-5 of the drawings. It includes an identical take off line 10a and exhaust modifier 11a with cooling fins 13a. It also includes an inlet line 14a which connects to the inlet chamber 15a of a somewhat different type of control valve assembly 12a. The control valve assembly 12a includes a control valve 17a, an outlet line 19a, an elongated shaft 20a and a spinner 21a having recesses 22a.

In this embodiment of the invention, the opening of the control valve 17a is not directly controlled by a cable connecting to the accelerator as in the embodiment of FIGS. 1-2. Instead, there is a flexible element 30a which is connected to the end of a shaft 20a remote from the spinner 21a. The opening and closing of the control valve 17a is controlled by the flexing movement of the flexible element 30a, the movement of which causes longitudinal movement of the shaft 20a.

A vacuum chamber 31a is disposed on one side of the flexible element 30a. On the opposite side is an atmospheric chamber 38a. A vacuum chamber 31a is connected through a line 32a to the intake manifold of the internal combustion engine. When the accelerator of the engine is depressed, the vacuum in the intake manifold of the engine automatically drops. This reduces the vacuum in the vacuum chamber 31a which normally holds the valve 17a in closed position and permits it to be moved to open position. A coil spring 23a normally urges the control valve 17a toward open position through pressure exerted upon a sealing member 33a which is connected to the shaft 20a.

The chamber 34a surrounding the coil spring 23a acts as a dashpot to smooth the opening and closing of the control valve 17a. A bleeder valve 35a may be provided to adjust the dampening action. Adjusting screws 36a and 37a may be provided at opposite ends of the shaft 20a to adjust its range of movement.

It should be noted that in the present invention gasoline mileage is not improved by consuming combustible elements which still remain the exhaust fumes after the first combustion, as taught by the prior art. The present invention operates in an entirely different manner by the deliberate introduction of non-combustible exhaust fumes in the combustion mixture for the purpose of retarding the combustion and thus making the combustion more complete.

It should also be noted that there is no addition of oxygen which would cause the engine to over heat. The present invention does not intensify the heat of the combustion, but instead tends to reduce it through slower rather than faster burning of the gasoline.

I claim:

1. An apparatus for improving gasoline consumption in an internal combustion engine of the type having an accelerator, an intake manifold and an exhaust manifold, said apparatus comprising means for automatically controlling the recirculation of a portion of the exhaust fumes from the exhaust manifold back to the intake manifold through the operation of the accelerator to retard the combustion of the engine and thereby reduce its gasoline consumption through improved combustion, said apparatus including an exhaust filter and cooler for filtering and cooling the exhaust fumes and valve control means for controlling the rate of flow of said exhaust fumes to the intake manifold, said valve control means including an inlet chamber to which said exhaust fumes are supplied, said inlet chamber having an exhaust port, a control valve for closing said exhaust port, the outer port engaging surface of said control valve being formed of non-metallic frictional material capable of withstanding the heat and chemicals present in said exhaust fumes, a spinner connected to said control valve and disposed in said inlet chamber, said spinner having means extending transversely to the direction of flow of said exhaust fumes into said inlet chamber, whereby said spinner and control valve are automatically rotated by said exhaust fumes to provide better wear and seating of said control valve, and means operable upon the depression of the accelerator to open said control valve.

2. An apparatus as described in claim 1, in which the opening in said control valve is controlled by a wire connected to the accelerator of the engine.

3. An apparatus as described in claim 1, in which the opening of said control valve is automatically controlled by a vacuum chamber connected to the intake manifold, whereby a change in vacuum resulting from the depression of the accelerator is transmitted from the intake manifold to said vacuum chamber to open said control valve.

4. An apparatus as described in claim 3, which includes a dashpot to control the operation of said control valve by said vacuum chamber.

References Cited

UNITED STATES PATENTS

| | | | |
|---|---|---|---|
| 1,750,995 | 3/1930 | Edwards | 123—90.28 |
| 1,860,641 | 5/1932 | Woolson | 123—119(A) |
| 1,916,325 | 7/1933 | McAdams | 123—119(A) |
| 2,119,268 | 5/1938 | Collins | 123—119(A) |
| 2,317,582 | 4/1943 | Bicknell | 123—119(A) |
| 2,408,846 | 10/1946 | Golden et al. | 123—119(A) |
| 2,747,750 | 5/1956 | Rounds et al. | 123—119(A) |

WENDELL E. BURNS, Primary Examiner